United States Patent [19] [11] 4,124,148

Vieler et al. [45] Nov. 7, 1978

[54] APPARATUS FOR A CONTAINER WITH AN ATOMIZER FOR, IN PARTICULAR, COSMETIC FLUIDS

[75] Inventors: Werner Vieler; Karl Vieler, both of Herne, Fed. Rep. of Germany

[73] Assignee: Firma Carl Vieler, Herne, Fed. Rep. of Germany

[21] Appl. No.: 741,714

[22] Filed: Nov. 15, 1976

[30] Foreign Application Priority Data

| | | | |
|---|---|---|---|
| Dec. 24, 1975 | [DE] | Fed. Rep. of Germany | 2558645 |
| Aug. 13, 1976 | [DE] | Fed. Rep. of Germany | 7625457 |
| Oct. 29, 1976 | [DE] | Fed. Rep. of Germany | 2649326 |

[51] Int. Cl.² .............................................. G01F 11/02

[52] U.S. Cl. .............................. 222/321; 222/402.15; 222/474

[58] Field of Search ............... 222/465, 466, 469, 470, 222/471, 472, 473, 475, 402.13, 402.15, 321, 341, 383-385

[56] References Cited

U.S. PATENT DOCUMENTS

| | | | |
|---|---|---|---|
| 1,747,800 | 2/1930 | Symons | 222/472 X |
| 1,823,654 | 9/1931 | Hast | 222/470 X |
| 1,947,088 | 2/1934 | Johnson et al. | 222/473 X |
| 2,915,251 | 12/1959 | North, Jr. | 222/402.15 X |
| 3,318,493 | 5/1967 | Belpedio | 222/474 X |
| 3,478,935 | 11/1969 | Brooks | 222/341 X |
| 3,478,938 | 11/1969 | Krause | 222/402.15 X |

*Primary Examiner*—Stanley H. Tollberg
*Attorney, Agent, or Firm*—Andrus, Sceales, Starke & Sawall

[57] ABSTRACT

An actuating device for a container mounted atomizer pump includes a bracket providing a pair of pivot points adjacent the pump. A lever has one end mounted on said pivot points, a second end which slopes downward to accommodate the thumb of the user, and an intermediate portion lying across the top of the pump for operating same when the second end is depressed by the thumb. Additionally a hand grip may be provided below the lever for receiving the fingers of the user.

6 Claims, 6 Drawing Figures

APPARATUS FOR A CONTAINER WITH AN ATOMIZER FOR, IN PARTICULAR, COSMETIC FLUIDS

BACKGROUND OF THE INVENTION

The invention is directed to apparatus for a container with an atomizer for, in particular, cosmetic fluids, which are atomized radially out of a closed container in the form of an aerosol by means of a pump arranged on the closure of the container by pressure on a handle movable axial or coaxial to the container.

In particular the invention is usable in a container, which forms an alternative to the packaging of the referred to fluid in a so-called spray can. Such a container replaces the action of the propellant gas with the action of its pump. The omission of the propellant gas is sought on different grounds. While only certain propellant gases are carcinogenic, many of the materials produced by propelling action mixture, for example, shellac, are adhesive and therefore dangerous to the breathing organs. Moreover, with certain cosmetic liquids, for example, with hair sprays, the consumption per head in some hair styling salons is proportionately high. With others, for example, medicinal sprays, such as mouth sprays, the mixing of the propellant gas and the fluid medicine is harmful.

The pumps which are required for the forming of an aerosol are, in themselves, known. They insure a fine atomization of the fluid which corresponds to the action of the spray can, but avoid because of its better measuring potentiality, losses in the produced fluid. On the other hand, such pumps have the feature that they slip as a consequence if a proportionately high pressure is produced and the delivered quantity is reduced. With small pressure and/or great output the atomization is insufficient. The necessary pressures are for the most part produced with the thumb of the hand. With sufficiently fine atomization and a specified quantity must a corresponding high movement energy be applied, for example, a hair dresser with a spray quantity of 3–6 grams according to purpose. With very fine spray must then a high amount of movement energy be applied because many fine sprayers require for 1 $cm_3$ fluid production that the hand pump be actuated 15 to 20 times.

A coarse sprayer is known for containers for the sprinkling of wash, with which the handle comprises a push button on which the pulley stem of the pump is attached. In the closure is positioned a ring through which the index finger of the hand can be inserted and with the thumb of the hand the handle is pressed. One or all of the rest of the fingers of the respective hand support with their outsides the container with the discharge. The weight of the container and the opposing force for the thumb pressure must, with these devices, practically entirely with the index finger of the respective hand be resisted. As a result, a rapid fatigue appears with multi-actuation of the pump and with high pump pressures.

Known further is an apparatus for a container with a coarse sprayer in which the pump is arranged radially to the container and the hand grip on the pump works in accordance with the manner of the trigger guard of a pistol grip. In this connection the neck of the container is grasped with the hand, the index finger of which actuates the trigger guard. The thumb of the hand is then fully released. This known apparatus has the disadvantage that they are not useful for atomizers in which the handle must be moved axially or coaxially to the container through the actuation of the thumb. Besides the feasibility of known apparatus is limited to a container form which can be gripped with the fingers of the hand.

SUMMARY OF THE PRESENT INVENTION

The invention provides, for a fine atomizer, a device, which is suitable for arbitary container forms and, with multiple actuation with the thumb and also with high pump and hand pressure, so far defers the fatigue point of hand, that the required fluid volume can be provided.

According to the invention it is therethrough obtained that in the area of the closure on the container there is attached a radial projecting hand grip which with the actuation of the handle with the thumb of the hand, the inner side of the remaining fingers of the same hand is correspondingly, proportionately effected.

In this connection the hand grip serves to the accommodation of the container weight and to the bracing of the thumb pressure, which is exerted on the handle. That the hand must grasp the container is thereby avoided. Arbitrary container forms are thereby possible, including those which could not, or only with difficulty be grasped with the hand. However, the inner side of all fingers of the hand, with the exception of the thumb, can be used for the accommodation of the container weight and the bracing of the thumb pressure. Therethrough is the hand relieved and the fatigue point deferred.

The container form which in the area of the closure is designed in a proportionally slender fashion, for example, to present a narrow neck, is suitable as an embodiment of the invention in which the container and closure is arranged between the index finger and the following fingers of the hand. With this embodiment it is provided that the hand grip presents a suitable projection for the index finger of the hand. The closure of the container is arranged between the projection and a further part of the hand grip, which is correspondingly proportioned to the remainder of the fingers of the hand.

This embodiment has the advantage that the pump pressure is supported between two supports, namely the index finger and the remainder of the fingers of the hand, so that the torque moment that the pump pressure and/or the container weight produces on the hand grip is reduced.

If particularly high pump pressures and/or particularly many pumping actuations are necessary to produce a given fluid weight, it is recommended that the thumb of the hand be released. To this purpose it is provided, that the hand grip presents a lever which with its underside pressure on the handle and presents to the thumb of the hand a correspondingly proportional grip. A leverage transmission for the thumb pressure can thereby be produced, which facilitates the operation.

The described apparatus can in the first instance be attached to the referred to container. For specified purposes for example with refilled containers in hair dressing salons or the like it is recommended, however, that the apparatus be designed so that it can be employed successively on many containers. For this purpose it is provided, according to the invention, that the hand grip is supported between the closure and a radial outer surface of the container.

To reduce the friction between the handle and the above referred to lever, one or more rollers can be provided which press on the handle.

An object according to the invention is also the accommodation of the support force serving two armed lever, which is fastened to the upper portion of the container neck and the lower portion of the handle and in which two different hand positions are possible.

Either the index finger or the thumb of the actuating hand grasping the narrowed neck of the container lays on the handle. With actuation of the handle with the thumb, the index finger, either alone or together with the upper side of the hand adjacent the thumb serves to support the two armed lever and therewith the application of the thrust force. If the index finger is applied in the operation of the handle, the middle finger serves with the one armed lever; with a two armed lever the middle finger and the thumb or the upper surface of the hand adjacent the hand serves for support.

The apparatus according to the invention has therefore the advantage that the opposing forces can be mainly transmitted by the two armed lever on the container. The corresponding force, which by the actuation hand must be produced, is thereby minimized to prevent a slipping of the container out of the hand. This minimization is such that the actuating hand tires later than heretofore.

Preferably the two armed lever provided by the invention is loosely attached on the container. That has the advantage that the apparatus can be repeatedly employed. It similarly permits the pump and its handle to be transferred from an empty to a full container.

Preferably for this purpose the two armed lever is clamped between the closure and the container.

It is further expedient to so arrange the pair of arms of the lever that they are aligned with each other; that is that they are displaced 180° opposite each other. It is further recommended that one or both arms of the lever be upwardly bent in a manner to adapt to the anatomical contour of the part of the operating hand, which serves as support, the distance between the operating and holding fingers thus to diminish.

The until now described exemplary form of the invention solved the problem with arbitrary container forms and further postponed the fatigue point of the hand with multiple operation of the handle with the thumb and with high pump and handle pressure to provide the necessary fluid volume.

The container forms are also arbitrary insofar that special forms which the hand cannot or only with difficulty grasp are permitted. Moreover all fingers of the hand, with the exception of the thumb, with their inner sides can be used to the accommodation of the container weight and to support of the thumb pressure. Therethrough is the hand relieved and its fatigue point deferred.

With the practical realization, however, one cannot arbitrarily extend the distance of the lever from the handle if one wants to retain the intended combined effect resulting from the device. Hence follows the necesity that the fingers of the same hand must grasp the lever and hand grip simultaneously. On the other hand, the axial and coaxial extension of the handle and/or the container closure of marketable atomizer and fluid containers are different. As a result, there are dimensions which for the foregoing combined reasons exceed the necessary distances.

From the foregoing, the invention also refers to a new apparatus so arranged that the axial or coaxial dimensions of the atomizer handles and/or container closures which exceed the limit of the handleless maximum space between the hand grip and the lever should accommodate without effect on the apparatus so that combined effectiveness is not placed in question.

There will therethrough result that between the underside of the hand grip and the radial container flange together with the hand grip, a hollow spacer is arranged to serve for the adjustment of the partial length of the handle and/or the container closure.

Since the spacer is hollow formed, it can receive a lower part, respectively, the entire container closure and return therethrough the hand grip to the area of the lever, if the handle of the atomizer presents a larger axial length As for the remainder, the spacer is proportioned so that it can equalize the difference of these lengths to the allowable distance between the lever and the hand grip in the apparatus.

The apparatus according to the invention has the advantage that it, exhibits its combined effect independently of, not only the respective form of the container but also the form of the different commercially available atomizers.

In variation and according to another feature of the invention the spacer forms a unitary structure with the hand grip. Herethrough it is possible to provide an inseparable arrangement which facilitates its readiness and mounting in the referred to container.

The spacer provides on its lower end according to a preferable exemplary form of the invention an inner flange for the container closure to produce an intended bracing of the inner flange. The hand grip itself is thus therefrom released.

According to another feature of the invention the spacer provides outer and inner walls diverging upwardly from the inside. The introduction of the container closure in the inside of the spacer is thereby likewise facilitated.

BRIEF DESCRIPTION OF THE DRAWING

The details, further features and other advantages of the invention will be apparent from the following description of an embodiment thereof in connection with the Figures of the drawing.

In the Figures, similar reference numerals identify corresponding parts.

DETAILED DESCRIPTION OF THE PREFERRED EMBODIMENT

Figure 3:
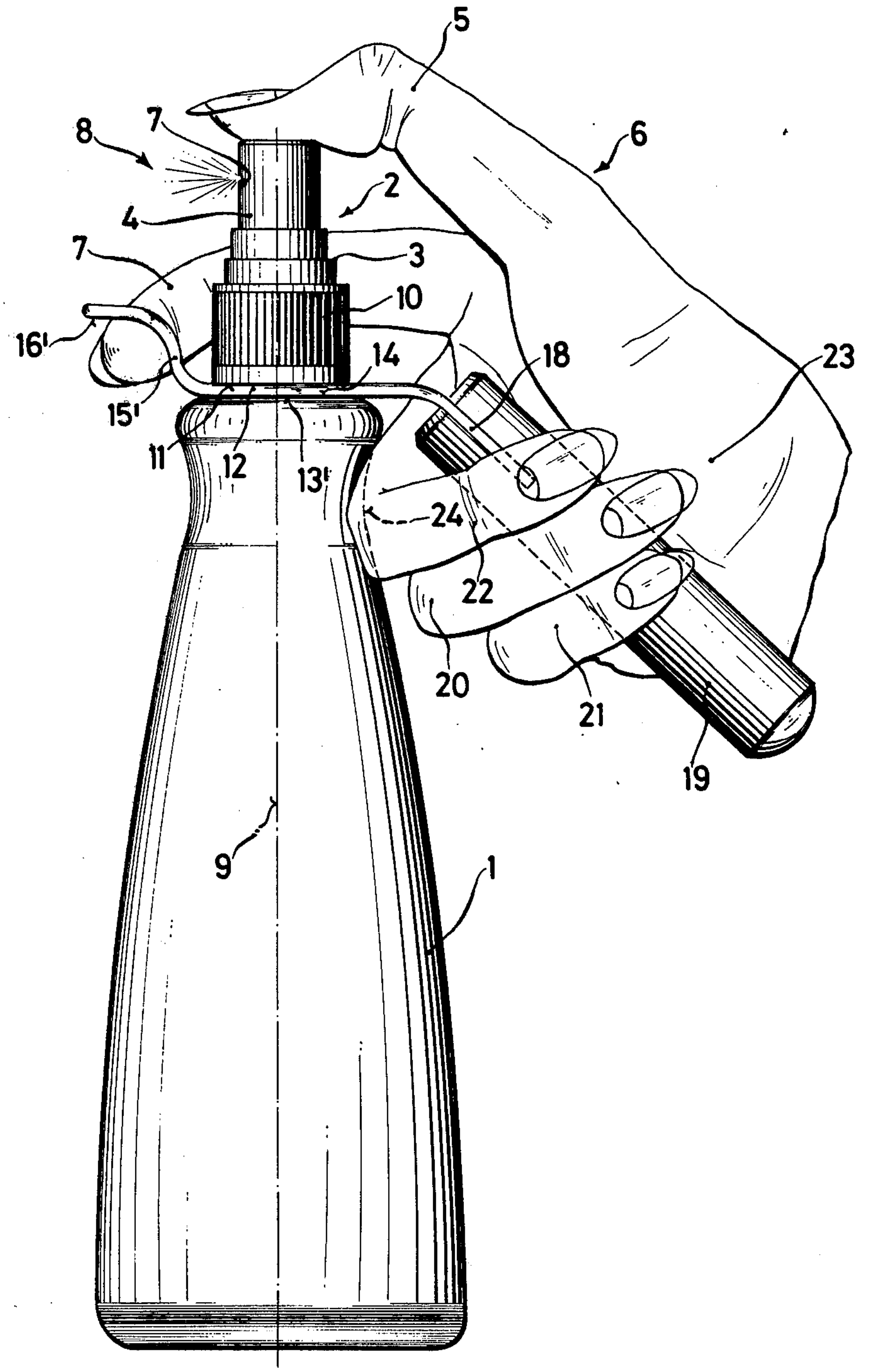
FIG. 3 is a view similar to FIG. 1 of a modified embodiment of the invention.

According to FIG. 3 is shown the comparatively simplest embodiment of the invention.

A container 1 is provided with an atomizer indicated generally as 2. The details of the pump 3 mounted thereon are not shown. The pump is, however, so constructed that it draws a prescribed volume of fluid out of the inside of the container and by the actuation of the button 4 with the thumb 5 of a hand 6 emits this fluid volume according to injector principles through a radially directed nozzle 7 in the form of fine atomization streams. For this purpose, the button 4 must be depressed in the direction of the container axis 9. It returns by itself to its discharge position. An installed spring, which in the Figures however is not apparent, serves this purpose.

The disclosed arrangement sits on a screw cap 10 which is threaded on the outer threads of the container and presses on a plate 12 with its lower planar end surface 11. The plate 12 is thereby supported with its underside 13 on a radial surface 14 on the neck of the container 1.

The plate 12 is an injection diecast or molded part, and has an upwardly and forwardly pointing projection 15, of which underside 16 is provided as a counter surface for the inner and upper side of index finger 17 of hand 6. A further projection 18, lying diammetrically opposite projection 15 serves, according to the exemplary embodiment, for the attachment of a cylindrical wooden grip 19, which is formed as a hand grip. The wood grip accommodates the remainder of the fingers 20 through 22 of the hand 6, however, according to a disclosed exemplary embodiment, is shaped somewhat longer so it can employ the ball of the hand.

In the exemplary embodiment shown in FIG. 3 the outer side of the middle finger 22 serves to the brace the container 1 in the region of the reentrant angle section 24, which is adjacent to the container opening.

Figures 1, 2:
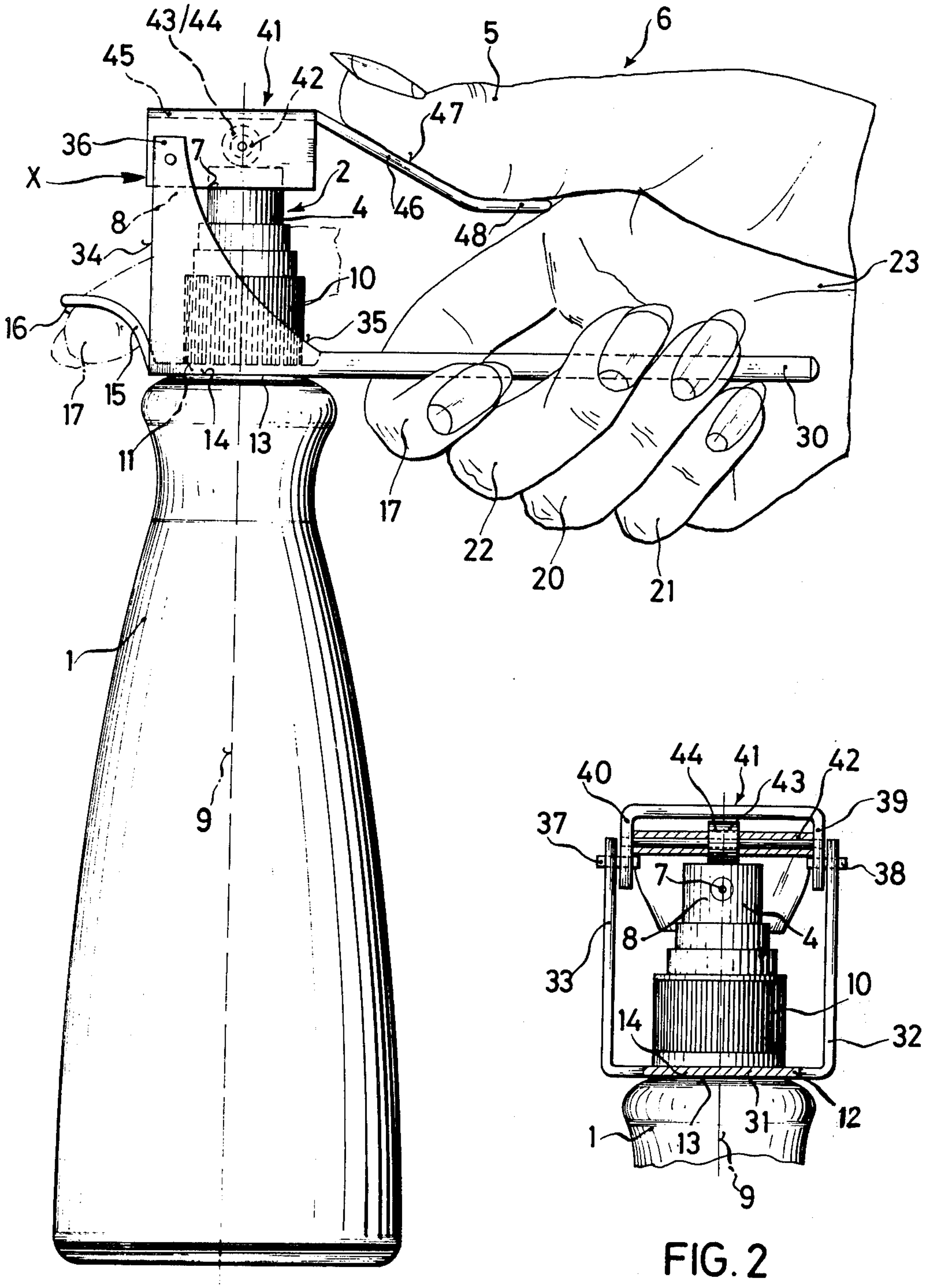
FIG. 1 is a schematic side view of a device according to the invention showing its actuation by a hand.
FIG. 2 is a view of the device according to FIG. 1 taken in the direction of the arrow X of FIG. 1.

With the exemplary embodiment according to FIGS. 1 and 2, two positions of the hand are possible. The first position is represented by the solid lines.

Accordingly the hand 6 grips the radially projecting hand grip 30 with the inner edge of the index finger 17 and the inside of the following fingers 20, 21 along with the inner side 23 of the hand. According to the disclosed exemplary embodiment, hand grip 30 exhibits a rectangular shape, as noted by 31 in FIG. 2. Two brackets 32, 33 are formed as one piece with the hand grip section and provide a vertically running leading edge 34, and a curved rear surface 35. On its upper end 36 are located pivot points which respectively comprise pins 37 and 38 fastened in brackets 32 and 33 and pin bearings located on brackets 39, 40 of a lever 41.

The brackets 39 and 40 serve to journal an axle 42 on which is positioned two rollers 43 and 44 which press on handle 4.

The lever 41 has a forward section 45, somewhat parallel to the hand grip 30. To this is attached a bent section 46, the upper side 47 of which forms the bearing area for the thumb 5. The thumb also presses on the end section 48 of lever 41 which according to the disclosed exemplary embodiment runs parallel to the section 45.

The projection 15 makes possible an alternative manipulation in which the hand grasps only with the fingers 21, 22 of hand grip 30 and the index finger 17 grasps under the projection 15.

Figure 4:
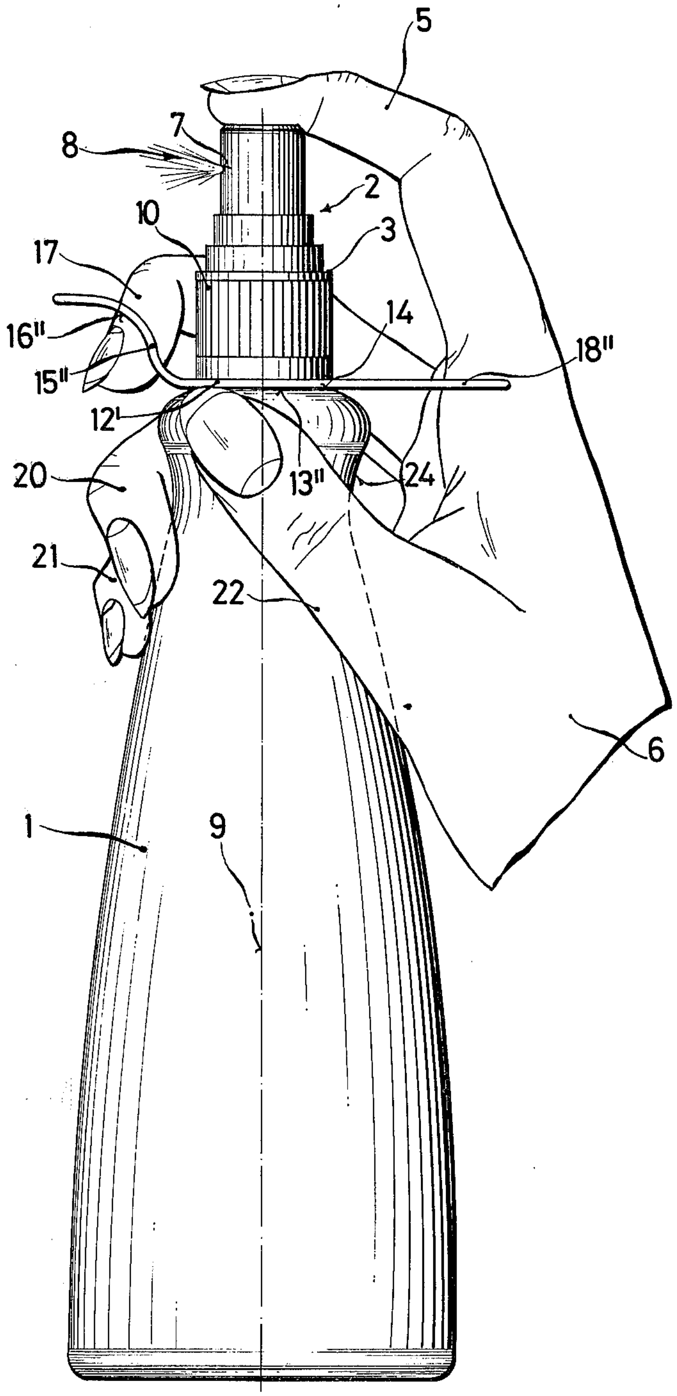
FIG. 4 shows another manner of actuating the device shown in FIG. 1.

The plate, or a correspondingly formed injection molded part of thermoplastic or thermo-setting plastic material, generally displays a two armed lever, the arms of which are identified as 15 and 18. The upward and forward pointing arm 15, the underside 16 of which is offset upwardly serves, as shown in FIG. 4, as a support for the middle finger of the actuating hand identified as 17. The second, additional arm 18, of lever 12, positioned diammetrically opposite to arm 15, lies on the upper side of the hand which borders immediately on the thumb.

As shown, the hand therefore grips the proportional slender neck 24 with fingers 20–21 along with the thumb 22. The thumb is supported on the arm 18. When the index finger exerts pressure on the handle 4 the container cannot slip out of the grip through the fingers 20–22 permitting the container to be held proportionately loosely.

In variation from the exemplary embodiment disclosed in FIG. 4, the two armed lever can lay on the index finger, on the one hand, and the thumb, on the other hand.

Figures 5, 6:
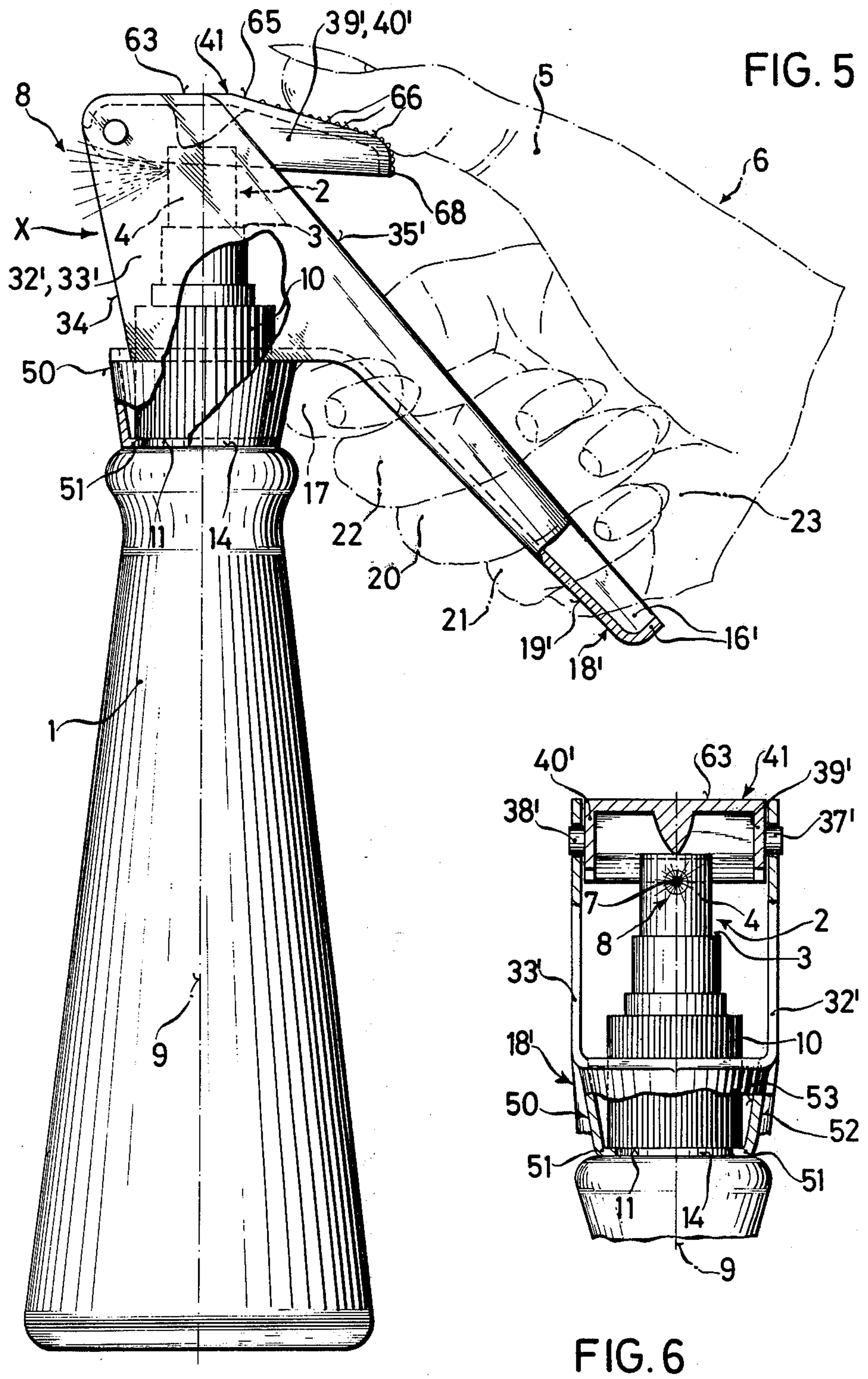
FIG. 5 is a schematic side view of another embodiment of the device according to the invention showing its actuation with a hand.
FIG. 6 is a view of the device according to FIG. 1 taken in the direction of the arrow X of FIG. 5. The view is partially in section to show certain features.

The injection molded part according to the FIGS. 5 and 6 has a projection 18 pointing from the container which serves as a hand grip. As a result, the hand grip has upwardly bent longitudinal and transverse edges 16 along with a flat underside 19. The hand grip is thus grasped by the fingers 20–22 of the actuating hand 6.

As FIG. 5 shows, the hand 6 grasps the radially projecting hand grip 18 with the inner edge of the index finger 17 and the inner side of the following fingers 20–21 along with the inner side 23 of the hand. Formed in a unitary structure with the hand grip are two brackets 32 and 33 which provide an essentially vertically running forward edge 34 along with the transition rearward edges 35 of the hand grip. On the upper ends are located pivot points which respectively comprise pivot bearings in brackets 32 and 33 and pins 37 and 38 mounted in brackets 39 and 40 of lever 41.

The lever carries on its underside a somewhat three cornered projection, which presses on the upper side of the disclosed handle. The lever 41 has formed in the remainder of its upper side somewhat horizontal running surfaces 63 on which borders a downwardly bent partial surface 65. On this partial surface is formed corrugated projections 66 as bearing for the thumb 5. These projections extend also over the vertical terminal end 68 of lever 41.

In variance from the disclosed exemplary embodiment the hand can grip the hand grip and the index finger 17 thereof used to press on the lever 41.

Between the underside of the hand grip and the above described radial container surface 14 is provided a hollow spacer 50. It serves to adjust a partial length of the handle 4 of the atomizer, particularly, the container closure, which otherwise the combined, necessary spacing of lever 41 with respect to the hand grip 18 would be unduly large.

The spacer 50 forms a single part with the hand grip so that, in toto, a one piece apparatus exists. In its lower end the spacer 50 provides an inner flange 51 on which the container closure is supported. The inner flange 51 is accordingly braced with the container closure on the radial surface 14 of container 1. Moreover the spacer 50 provides outer and inner walls 52 and 53 upwardly diverging from beneath.

Although according to the disclosed exemplary embodiment the spacer 50 forms a single element with the remaining parts of the apparatus, it can also occur as separate parts so that one can use the same basic structure for different partial lengths of the handle and the container closure. One need only employ different spacers 50 in accordance with the size of the container and the handle of the atomizer in each case.

We claim:

1. An actuating device for a container having a pump axially mounted on top of the container for radially discharging atomized fluids responsive to pressure axially applied to the pump, said device comprising:

a base member for mounting said device on said pump or container;

a bracket means mountable on said base member, said bracket means having a pair of arms on opposite sides of the pump, said arms extending upwardly along and adjacent to the pump and terminating in pivot points spaced in a direction normal to the axis of the container and pump and located at an axial position approximating the top of said pump, said pivot points being radially spaced from said pump in the direction of discharge by a small distance;

a lever having one end pivotally mounted at said pivot points, said lever having an intermediate portion positioned across the top of said member for contacting said pump at a point closely spaced from said pivot points, said lever having a bent portion beyond said intermediate portion, said bent portion slanting downward, and a second end of said lever shaped to accommodate the thumb of the user for depressing said lever and pump and discharging atomized fluid, and a hand grip having a pair of projections extending radially from opposite sides of said base member, one of said projections being suitable for engaging the index finger of the user, the other of said projections receiving the remaining fingers of the user.

2. The actuating device according to claim 1 wherein the intermediate portion of said lever includes at least one roller for contacting the top of said pump.

3. The actuating device according to claim 1 wherein the one of said projections suitable for engagement by the index finger is bent upwardly.

4. The actuating device according to claim 3 wherein the other of said projections is bent downwardly.

5. The actuating device according to claim 1 further including a spacer operatively associated with said base member for positioning said lever with respect to said container.

6. The actuating device according to claim 5 wherein said spacer is integrally formed with said base member.

* * * * *